(12) United States Patent
Wheeler et al.

(10) Patent No.: US 11,057,207 B2
(45) Date of Patent: Jul. 6, 2021

(54) SYSTEMS AND METHODS OF TRUSTED OWNERSHIP RE-KEY WITH ATTESTATION

(71) Applicant: Intel Corporation, Santa Clara, CA (US)

(72) Inventors: David Wheeler, Chandler, AZ (US); Geoffrey Cooper, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 16/235,507

(22) Filed: Dec. 28, 2018

(65) Prior Publication Data

US 2019/0140828 A1 May 9, 2019

(51) Int. Cl.
*H04L 9/32* (2006.01)
*H04L 9/08* (2006.01)
*H04L 9/00* (2006.01)
*H04L 9/06* (2006.01)

(52) U.S. Cl.
CPC ............ *H04L 9/0891* (2013.01); *H04L 9/006* (2013.01); *H04L 9/0662* (2013.01); *H04L 9/0897* (2013.01); *H04L 9/3242* (2013.01); *H04L 9/3247* (2013.01); *H04L 9/3297* (2013.01); *H04L 2209/80* (2013.01)

(58) Field of Classification Search
CPC ....... G06F 21/30–335; G06F 21/44–45; H04L 63/08; H04L 9/006; H04L 9/0662; H04L 9/0891; H04L 9/3242; H04L 2209/80; H04L 9/0897; H04L 9/3247; H04L 9/3297

See application file for complete search history.

(56) References Cited

U.S. PATENT DOCUMENTS

2017/0366347 A1\* 12/2017 Smith ................... H04L 9/3247

\* cited by examiner

*Primary Examiner* — Olugbenga O Idowu
(74) *Attorney, Agent, or Firm* — Alliance IP, LLC (57) ABSTRACT

The present disclosure is directed to systems and methods of providing a trusted ownership re-key with attestation in a device. The device includes processor circuitry that incorporates TEE circuitry. The TEE circuitry generates an AAIK and encrypts the AAIK using HMAC. The TEE circuitry forms a first message using the HMAC, a public DAK assigned to the device, and a device signature. The TEE circuitry sends an encrypted first message to the manufacturer. The manufacturer validates the device based on the public DAK and generates a second message that includes the HMAC and a manufacturer signature. The encrypted second message is communicated to the TEE circuitry. Upon receipt the TEE circuitry validates the AAIK data in the second message against the most recent AAIK and generates a third message that includes the HMAC, the original AAIK, the RHK and the manufacturer attestation. The AAIK thus remains unknown to both the current owner and the manufacturer.

25 Claims, 7 Drawing Sheets

SYSTEMS AND METHODS OF TRUSTED OWNERSHIP RE-KEY WITH ATTESTATION

TECHNICAL FIELD

The present disclosure relates to systems and methods of provided a trusted attestation of device ownership and/or manufacturer.

BACKGROUND

Devices, such as cell phones and portable computers, often have a longer lifetime than expected, and are very often sold or given away after an extended period of use by a first owner. In some cases, such devices may have a number of serial owners. As such devices now include many embedded security features, including passwords and cryptographic information, it becomes important for each user to purge such embedded information prior to transferring ownership of the device to the subsequent owner. At times, such settings may be extremely difficult to change or may even be specifically configured to resist change in order to facilitate security features like strong identity and attestation. The need for the capability to delete and/or change such secret information becomes more acute when one considers residual secret information on a device opens the potential for a subsequent owner to perform transactions using the information and/or data associated with a former owner of the device.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The primary disadvantage of standard security approaches is the retention of a hardware-based rooted key in the device that may be used to trace the device. The endorsement key, in the case of the trusted platform module (TPM), can be queried on the device, even when the software performing the query has no rights. Since the Rivest-Shamir-Adleman (RSA) crypto parameters are unique, they may be used to provide a unique, unchanging, device identity that allows tracking of the device from owner to owner and between transactions.

Enhanced Privacy ID (EPID) signatures are more expensive in both time and power consumption than the corresponding RSA and Elliptic Curve Digital Signature Algorithm (ECDSA) signatures, negatively impacting widespread acceptance of EPID. Further, EPID is approaching the "quantum horizon"—the date (2030) where classic algorithms such as ECDSA may be ineffective due to fears that quantum computing technology can easily break the algorithm. The systems and methods disclosed herein provide a "post-quantum" solution for trusted attestation of a device.

In order to ensure trusted access from the device, secrets are placed in the device that are associated with a trusted party (example: a device key certified by a signing authority). If these secrets are used but never changed, or changed by having the old key endorse the next key, then the trust relationship may be used to trace the device, perhaps revealing operational secrets or personal privacy information. If the secrets are changed without reference to previous trust, the new trust is private, but the original trust of the device is lost (example: the trust in the original device manufacturer is replaced by trust in the person who received the device).

The systems and methods disclosed herein provide device attestation by first, obtaining a device attestation signed by the device manufacturer and then second, generating an encrypted transfer credential that can be decrypted by the new owner and that includes a device attestation signed by the manufacturer in such a way that the new owner is able to validate the provenance of the device as being from the device manufacturer without needing to see the manufacturer's key that is configured in the device. More specifically, the systems and methods disclosed herein provide two-part device attestation in which the trusted execution environment (TEE) in the device generates an anonymous authentication identity key pair (AAIK private & AAIK public) and then, using a hash-based method authentication code (HMAC) that includes a random HMAC key (RHK), generates an HMAC over the AAIK public key. The first step of the attestation process occurs when the device transmits a message to the device manufacturer that includes the HMAC and the device attestation public key (DAK public) that uniquely identifies the device to the manufacturer and is only known to the manufacturer. Other additional data may also be included, such as a time stamp. This message is signed by the DAK private key, and is encrypted to the manufacturer's public key. The manufacturer receives the message and after decrypting it and verifying that the signature is valid and the DAK public key is known and trusted, returns a message containing the same HMAC and any other additional data, signed with the manufacturer's private key, as an attestation verification to the device. This attestation verification is encrypted with the DAK-public, so only the device can decrypt it. Second, upon receipt of the attestation verification message signed by the manufacturer, the device generates a transfer credential that is communicated to the new owner of the device. The transfer credential is encrypted using the public key of the new owner and includes the AAIK public key (the AAIK private key is known only to the device) and the RHK. The new owner can use the well-known manufacturer's public key to verify the signature on the attestation verification, then use the AAIK-public and RHK to verify the HMAC. This indicates that the manufacturer endorses the AAIK key pair. Old AAIKs are removed from the device and the AAIK of the new owner then becomes the unique identifier assigned to the new owner. The use of the HMAC renders the AAIK-public unreadable to the manufacturer, beneficially maintaining the anonymity of the new owner of the device with respect to the manufacturer. This message is also encrypted to the manufacturer to maintain privacy with respect to other parties. The use of the new owner's public key to communicate the AAIK to the new owner beneficially preserves the identity of the AAIK such that the AAIK is readable only by the new owner of the device. Advantageously, since the transactions occur within the TEE and are essentially device/platform agnostic, the systems and methods described herein enjoy broad applicability across a large number of devices.

A host device attestation system is provided. The system may include: input/output interface circuitry; communications interface circuitry; processor circuitry that includes trusted execution environment (TEE) circuitry, the TEE circuitry to: generate an anonymous attestation identification key pair (AAIK); generate an attestation claim message that includes: data based, at least in part, on the anonymous AAIK pair; and data representative of a manufacturer assigned, private, device attestation key pair (DAK) stored in the TEE, the manufacturer assigned, private, DAK public uniquely identifying the host device; generate, responsive to receipt of an attestation verification message from the manufacturer, a transfer credential message that includes: the data based, at least in part, on the anonymous AAIK; and data representative of an attestation verification by the manufacturer, wherein the attestation verification message from the manufacturer includes: data representative of the manufacturer device attestation verification; and data representative of a manufacturer signature.

A host device attestation method is provided. The method may include: generating, by a host device, a first encrypted message using a private key known to a first entity affiliated with the host device; communicating, by input/output (I/O) interface circuitry in the host device, the first encrypted message to a manufacturer of the host device; receiving, at the host device, a second encrypted message that includes data representative of an attestation verification by the host device manufacturer; and generating, by the host device, a third encrypted message that includes: the data representative of the received attestation verification; and at least a portion of the first encrypted message responsive to receipt of attestation verification.

A non-transitory storage device is provided. The non-transitory storage device includes instructions that, when executed by trusted execution environment (TEE) circuitry in a host device, cause the TEE circuitry to: generate a first encrypted message using a private key known to a first entity affiliated with the host device; cause a communication of the first encrypted message to a manufacturer of the host device via input/output (I/O) interface circuitry in the host device; and generate, in response to receipt of a second encrypted message that includes data representative of an attestation verification by the host device manufacturer, a third encrypted message that includes: the data representative of the received attestation verification; and at least a portion of the first encrypted message responsive to receipt of attestation verification.

A host device attestation system is provided. The system may include: means for generating a first encrypted message using a private key known to a first entity affiliated with the host device; means for communicating the first encrypted message to a manufacturer of the host device; means for receiving a second encrypted message that includes data representative of an attestation verification by the host device manufacturer; and means for generating a third encrypted message that includes: the data representative of the received attestation verification; and at least a portion of the first encrypted message responsive to receipt of attestation verification.

As used herein the terms "about" or "approximately" when used to prefix an enumerated value should be interpreted to indicate a value that is plus or minus 15% of the enumerated value. Thus, a value that is listed as "about 100" or "approximately 100%" should be understood to represent a value that could include any value or group of values between 85 (i.e., −15%) to 115 (i.e., +15%).

As used herein the term "processor circuit" may refer to the physical circuitry included in a microprocessor or central processing unit (CPU), a virtual instantiation of a processor on physical circuitry included in a microprocessor or CPU, or combinations thereof. The term processor circuit may refer to a single- or multi-thread processor core circuit.

As used herein the term "device manufacturer" may refer to any entity involved directly or indirectly in the manufacture and/or distribution of processor-based devices. Such entities include, but are not limited to the device manufacturer and/or assembler and contracts to the device manufacturer such as public root certification authority.

Figure 1:
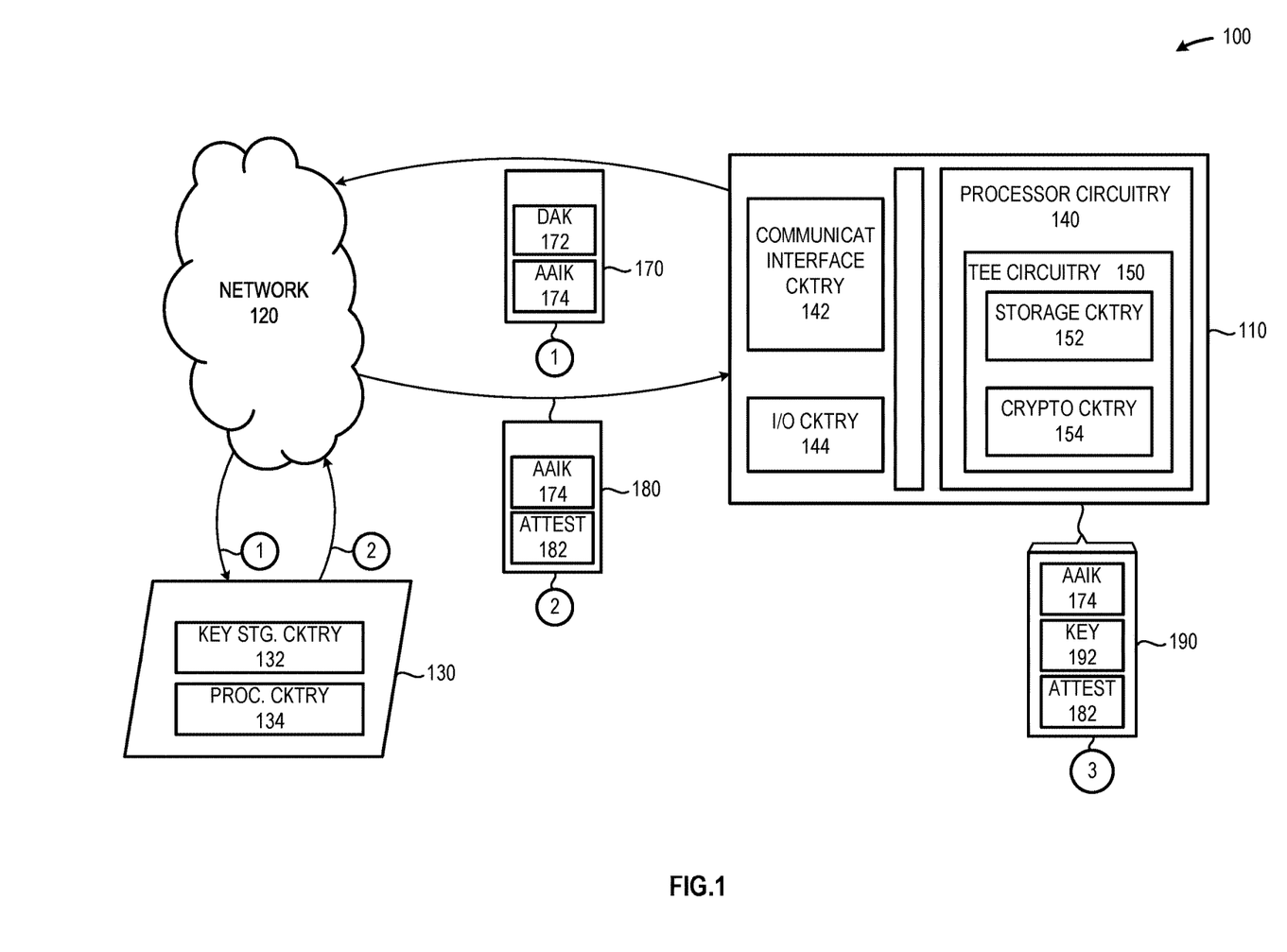
FIG. 1 depicts a block diagram of an illustrative system that includes a processor-based device coupled via a network to a remote device, in accordance with at least one embodiment described herein.

FIG. 1 is a block diagram of an illustrative system 100 that includes a processor-based device 110 coupled via a network 120 to a remote device 130, in accordance with at least one embodiment described herein. As depicted in FIG. 1, the processor-based device 110 includes processor circuitry 140, communications interface circuitry 142, and input/output (I/O) interface circuitry 144. The processor circuitry 140 includes trusted execution environment (TEE) circuitry 150. The TEE circuitry 150 includes at least memory circuitry 152. The processor-based device 110 exchanges messages 170, 180 with the one or more external devices 130. In embodiments, the TEE circuitry 150 generates an output message 190 in response to exchanging messages 170, 180 with the one or more external devices 130. The processor-based device 110 may include any electronic device capable of executing one or more machine-readable instruction sets. Nonlimiting examples of such processor-based devices 110 include: portable computers, smartphones, desktop computers, laptop computers, and similar. The one or more external devices 130 may include any electronic device capable of exchanging messages 170, 180 with the processor-based device 110 via one or more wired networks, one or more wireless networks, or any combination of wired and wireless networks 120. A nonlimiting example of one or more external devices 130 includes: one or more cloud-based servers that includes information and/or data associated with a manufacturer of the processor-based device 110 and/or an authorized representative of or contractor to the manufacturer of the processor-based device 110.

In embodiments, the one or more external devices 130 include but are not limited to: a persistent or non-transitory storage circuit or device 132 capable of storing information and/or data representative of the public keys assigned to each processor-based device 110. Such key information may be stored within one or more data stores, data tables, data structures. And/or databases formed, stored, contained, or otherwise retained in the storage circuitry or device 132. The one or more external devices 130 may additionally include one or more processor circuits 134. In embodiments, the one or more processor circuits 134 may execute machine readable instruction sets that provide the external device 130 with the capability to communicate with the processor-based device 110 and to compare public key information received via the network 120 from a processor-based device 110 to information and/or data stored in the data storage circuitry or device 132 as part of the manufacturer's authentication process or procedure for the processor-based device 110.

At times, a first user of the processor-based device 110 may desire to either change a personal identifier associated with the processor-based device 110 or may transfer ownership of the processor-based device 110 to a second user. In either instance, it is advantageous to (a) confirm that the processor-based device 110 is a device that has been authorized and/or authenticated by the manufacturer or a manufacturer's representative; and (b) reset and/or remove personal identification from the processor-based device 110 as part of re-establishing the provenance of the first user or transferring the device to a second user.

In operation, the first user may initiate a process that anonymously removes from the processor-based device 110 information and/or data associated with the first user and provides new information and/or data associated with a re-established first user profile or a newly established second user profile on the processor-based device 110. In response to a request to reset the processor-based device 110 by the first user, the TEE circuitry 150 generates an anonymous attestation identification key (AAIK). The TEE circuitry then retrieves data representative of a manufacturer assigned, public, device attestation key (DAK) 172 associated with the processor-based device 110 and stored in TEE memory circuitry 152.

The TEE circuitry 150 first encrypts the data representative of the AAIK and generates a first message (an "attestation claim" message) that includes the encrypted AAIK 174, the data representative of the public DAK 172 associated with the processor-based device 110, and data representative of a unique signature 176 generated by the processor-based device 110. The TEE circuitry 150 then encrypts the first message using a manufacturer's public key issued by the device manufacturer to provide a first encrypted message 170 that includes the public DAK 172 associated with the processor-based device 110, the encrypted AAIK 174, and the signature 176. The TEE circuitry 150 causes the processor-based device 110 to transmit the first encrypted message 170 to the device manufacturer 130.

In embodiments, the one or more external devices 130 include one or more servers accessible to the manufacturer of the processor-based device 110 and/or a designated representative of or contractor for the manufacturer of the processor-based device 110. Upon receipt of the first encrypted message 170, the one or more external devices 130 decrypts the first encrypted message 170 to obtain the data representative of the public DAK 172, the encrypted AAIK 174 (note that the encrypted AAIK 174 remains encrypted and unreadable by the device manufacturer even after the first encrypted message is decrypted), and the private DAK 176.

The device manufacturer is able to determine whether the processor-based device 110 is an authentic device using the data representative of the public DAK 172. In embodiments, the device manufacturer looks up in one or more data stores, data structures, or databases whether the public DAK 172 provided by the processor-based device 110 corresponds to a public DAK issued by the device manufacturer. After confirming that the public DAK 172 does indeed correspond to an authentic processor-based device 110 of the manufacturer, the one or more external devices 130 generates a second message.

The second message (an "attestation verification" message) includes a signature 182 generated by the manufacturer and attesting to the authenticity of the processor-based device 110. The second message also includes the encrypted AAIK 174. In embodiments, the second message may also include additional information and/or data 184, such as metadata and/or data representative of the time and/or date associated with the manufacturer's attestation. The one or more external devices 130 encrypt the second message to provide the encrypted second message 180 that is communicated to the processor-based device 110. In embodiments, the one or more external devices 130 encrypt the second message using the public DAK 172 associated with the processor-based device 110. The second encrypted message 180 is communicated by the one or more external devices 130 to the processor-based device 110.

Upon receipt of the second encrypted message 180, the processor-based device 110 decrypts the second encrypted message 180. In embodiments, the processor-based device 110 decrypts the second encrypted message 180 using the private DAK stored in the TEE memory circuitry 152. The TEE circuitry 150 may also verify the manufacturer's signature 182 using the manufacturer's public key. In embodiments, the processor-based device 110 may decrypt the encrypted AAIK returned from the one or more external devices 130 to confirm that the received second encrypted message is valid.

The processor-based device 110 then generates a third message (a "transfer credential" message) that will be provided to the next user of the device and deletes all prior AAIKs present on the processor-based device 110. The third message includes: the unencrypted AAIK retrieved from the TEE memory 152, the HMAC key associated with the encrypted AAIK communicated to the manufacturer in the first encrypted message 170, the unencrypted second message 180 received from the one or more external devices 130, and a signature 192 generated by the processor-based device 110. In embodiments, the third message may be encrypted using the public key of the next owner, thereby preserving the identity of the AAIK such that only the next owner is able to see the unencrypted AAIK.

The processor-based device 110 may include any processor-based device such as a portable computer, a handheld computer, a laptop computer, a wearable computer, a smartphone, a tablet computer, a desktop computer, or similar. The processor-based device 110 includes wired and/or wireless communication interface circuitry 142, such as one or more IEEE 802.3 (Ethernet) wired communication interfaces; one or more 802.11 (WiFi) wireless communication interfaces; one or more BLUETOOTH wireless communication interfaces; one or more near-field communication (NFC) communication interfaces; or combinations thereof. The processor-based device 110 may bidirectionally communicate with the one or more external devices 130 via the communication interface circuitry 142.

The processor-based device 110 includes wired and/or wireless input/output (I/O) interface circuitry 144. The processor-based device 110 may receive input, such as an input by a current user of the processor-based device 110. Such input may be provided using one or more hard or soft keyboards, one or more pointing devices, one or more touchscreens, one or more audio input devices, one or more tactile input devices, or combinations thereof. Such input devices may be integral with the processor-based device 110, tethered to the processor-based device 110 (e.g., via a universal serial bus interface), and/or wirelessly connected to the processor-based device 110 (e.g., via a BLUETOOTH or NFC wireless interface). The processor-based device 110 may generate audio, visual, and/or tactile output that is communicated to one or more output devices via the I/O interface circuitry 144. Such output devices may include but are not limited to: one or more displays, one or more audio output devices, and/or one or more tactile output devices that are integral with and/or wired/wirelessly coupled to the processor-based device 110.

The processor circuitry 140 includes the trusted execution environment (TEE) circuitry 150. The processor circuitry 140 may include any number and/or combination of currently available and/or future developed electronic components, semiconductor devices, and/or logic elements capable of reading and executing one or more machine-readable instruction sets. In embodiments, the processor circuitry 140 may include one or more processor core circuits, each of the processor core circuits capable of executing all or a portion of one or more machine-readable instruction sets or "threads." In embodiments, the processor circuitry 140 may include one or more: application specific integrated circuits (ASICs); one or more field programmable gate arrays (FPGAs); one or more reduced instruction set computers (RISCs); one or more digital signal processors (DSPs); one or more controllers; one or more microprocessors; a system-on-chip (SoC); or a multi-chip module (MCM). In embodiments, the processor circuitry 140 may include one or more other circuits, such as memory circuitry (e.g., $1^{st}$ Level (L1), $2^{nd}$ Level (L2), and/or last level (LLC) cache circuitry); controllers (e.g., memory control circuitry); communication bus circuitry; communication interfaces; and similar.

The processor circuitry 140 includes the TEE circuitry 150. In embodiments, the TEE circuitry 150 provides a secure environment within the processor circuitry 140. The TEE circuitry 150 runs parallel with the operating system of the processor-based device 110, in a secure, isolated environment. IN embodiments, the TEE circuitry 150 provides an environment in which the machine-executable instructions and data within the TEE circuitry are protected with respect to access from sources external to the TEE circuitry 150. In embodiments, the TEE circuitry 150 includes one or more of: persistent and/or non-persistent memory circuitry 152 and/or cryptographic circuitry 154 capable of encrypting and decrypting data using information/data stored in the TEE memory circuitry. In embodiments, the TEE memory circuitry 152 may store or otherwise retain information and/or data representative of the public DAK and private DAK assigned to the processor-based device 110 by the device manufacturer or a designee of the device manufacturer. In embodiments, the TEE memory circuitry 152 may store or otherwise retain information and/or data representative of one or more AAIKs. In embodiments, the TEE memory circuitry 152 may store or otherwise retain information and/or data representative of an HMAC RDK. In embodiments, the TEE circuitry 150 may execute one or more machine-readable instruction sets that provide the trusted ownership with re-key described herein.

Figure 2A:
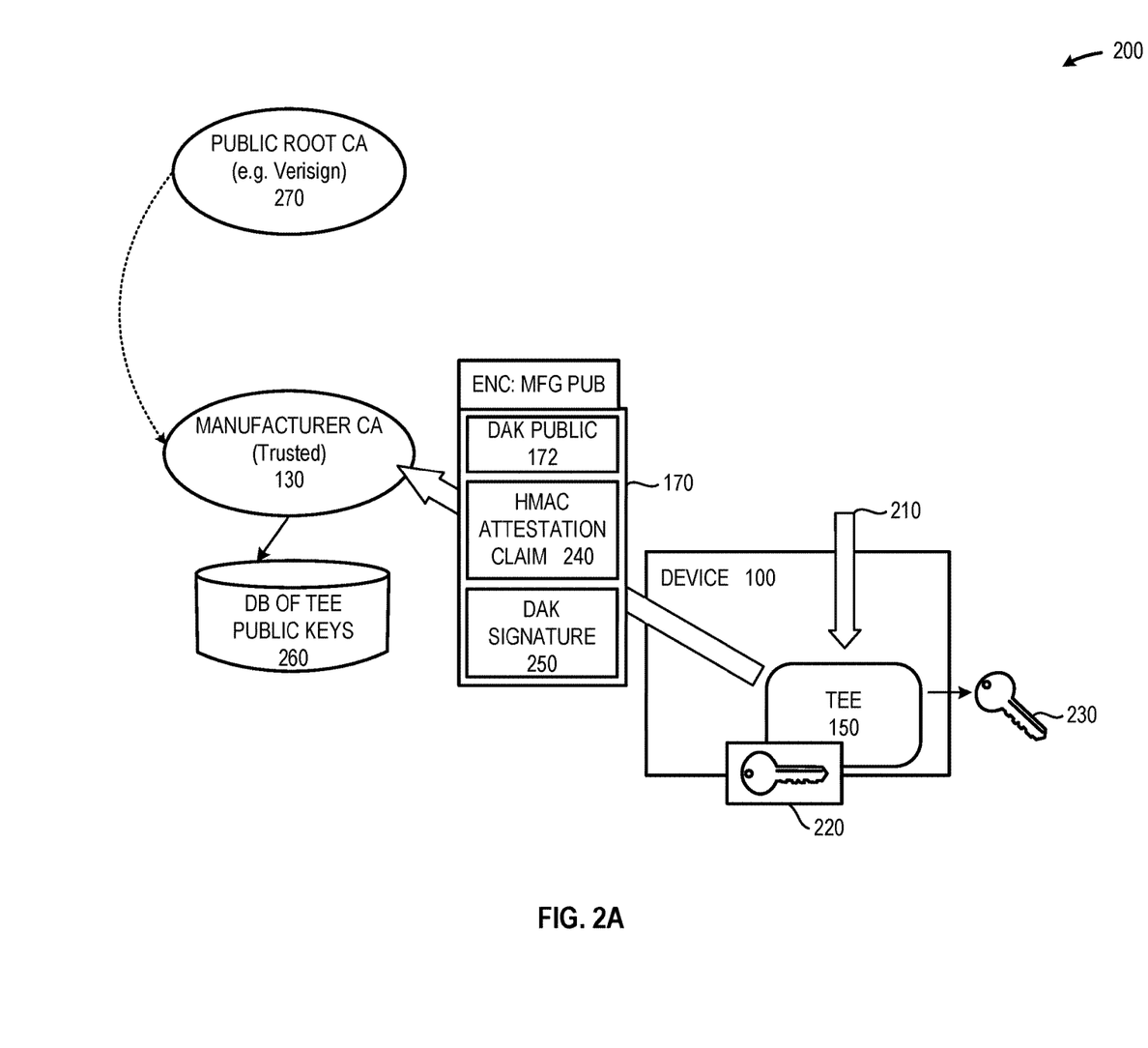
FIG. 2A depicts a schematic diagram of an illustrative system in which the processor-based device communicates an illustrative first encrypted message to one or more remote devices, in accordance with at least one embodiment described herein.
Figure 2B:
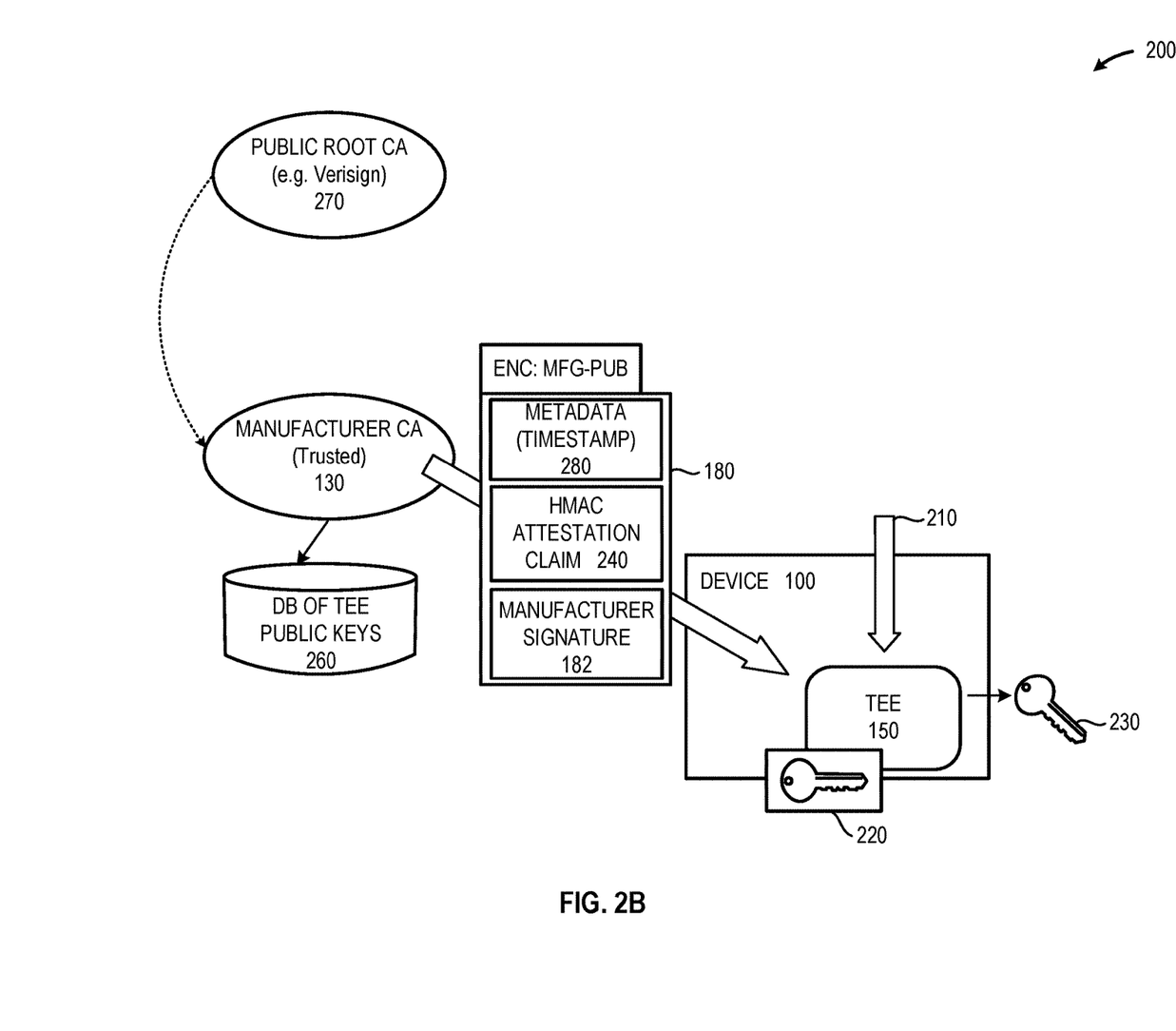
FIG. 2B depicts a schematic diagram of the illustrative system in which the one or more remote devices communicates an illustrative second encrypted message to the processor-based device, in accordance with at least one embodiment described herein.
Figure 2C:
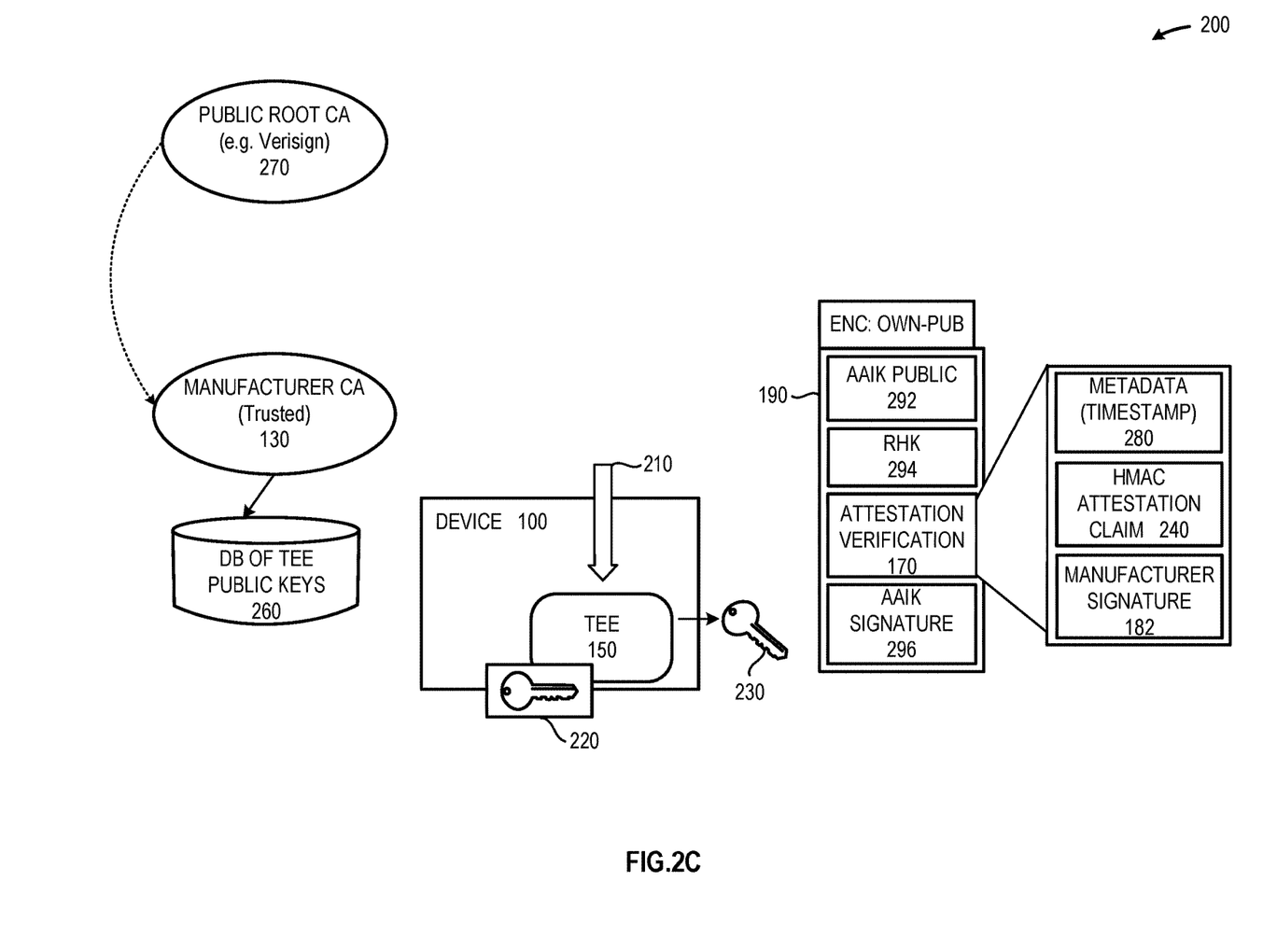
FIG. 2C depicts a schematic diagram of the illustrative system in which the processor-based device generates an illustrative third encrypted message, in accordance with at least one embodiment described herein.

FIG. 2A is a schematic diagram of an illustrative system 200 in which the processor-based device 110 communicates an illustrative first encrypted message 170 to one or more remote devices 130, in accordance with at least one embodiment described herein. FIG. 2B is a schematic diagram of the illustrative system 200 in which the one or more remote devices 130 communicates an illustrative second encrypted message 180 to the processor-based device 110, in accordance with at least one embodiment described herein. FIG. 2C is a schematic diagram of the illustrative system 200 in which the processor-based device 110 generates an illustrative third encrypted message 190, in accordance with at least one embodiment described herein.

Referring first to FIG. 2A, the processor-based device 110 receives an input 210 requesting the generation of a new AAIK and/or a transfer certificate. In embodiments, the request may be generated by a current owner/user of the device to provide a new AAIK for the current owner/user's personal use. In other embodiments, the request May be generated by the current owner/user preparatory to transferring custody of the processor-based device 110 to the next owner/user. In embodiments, the processor-based device 110 may request the current owner/user enter one or more security credentials (password, biometric characteristic, etc.) prior to commencing the generation of a new AAIK.

Once the process commences, the TEE circuitry 150 creates the anonymous attestation identity key (AAIK) 220. The TEE circuitry 150 stores, contains, or otherwise retains information and/or data representative of the device attestation key (DAK) 230, which may include information and/or data representative of the public DAK associated with the processor-based device 110. The TEE circuitry 150 then encrypts the AAIK 220. Although any encryption method may be employed, in some embodiments, the TEE circuitry 150 generates a random hash key (RHK) and employs the RHK to encrypt the AAIK 220 via a hash message authentication code (HMAC) to create an HMAC attestation claim 240. The HMAC attestation claim 240 includes the encrypted AAIK 220 and the RHK. The TEE circuitry 150 then generates an attestation claim message (i.e., the first encrypted message) 170 for communication to the at least one external device 130, such as a server associated with the manufacturer of the processor-based device 110. The attestation claim message 170 includes the public device attestation key 172 associated with the processor-based device 110 and a device signature 250 generated by the TEE circuitry 150. In some embodiments, the device signature 250 may be generated using, at least in part, the private DAK 230 associated with the processor-based device 110. The TEE circuitry 170 then encrypts the attestation claim message 170 to provide the first encrypted message. In embodiments, the TEE circuitry 170 may encrypt the attestation claim message using the manufacturer's public key.

The processor-based device 110 then communicates the encrypted attestation claim message 170 to the at least one external device 130. In embodiments, the at least one external device 130 may include a data store, data structure, or data base 260 that includes data representative of at least a portion of the public DAKs issued by the manufacturer of the processor-based device 110. In some implementations, the manufacturer of the processor-based device 110 may use a third party to provide device attestation services—an example third party is VERISIGN. In such implementations, the external device associated with the manufacturer of the processor-based device 110 may communicatively coupled to one or more third party external devices 270. The device attestation claim 170 requests that although the manufacturer is unable to decrypt the HMAC attestation claim 240 (the manufacturer does not have the RHK), the manufacturer attest to the provenance of the processor-based device 110 public DAK supplied with the claim attestation message 170.

Referring next to FIG. 2B, upon receipt of the encrypted attestation claim message 170, the at least one external device 130 decrypts the message using the manufacturer's private key. The decrypted attestation claim message 170 reveals the processor-based device public DAK 172 and the processor-based device signature 250. The HMAC encrypted AAIK remains encrypted and unreadable by the manufacturer. The at least one external device 130 then compares the processor-based device public DAK 172 to determine whether the public DAK 172 represents one assigned by the manufacturer and that the processor-based device public DAK 172 is associated with a valid, unrevoked processor-based device 110. In embodiments, the manufacturer also verifies the processor-based device signature 250. In response to a determination that the processor-based device public DAK 172 is associated with a valid, unrevoked processor-based device 110, and, in at least some embodiments, a successful verification of the processor-based device signature 250, the at least one external device 130 generates an attestation verification message (i.e., the second encrypted message) 180 for communication to the processor-based device 110.

In embodiments, the attestation verification message 180 includes the HMAC attestation claim 240 and a signature generated by the manufacturer 182 that attests to the provenance of the processor-based device 110. In addition, in some embodiments, the attestation verification message 180 may include metadata, such as time stamp data or similar, 280. The at least one external device 130 may encrypt the attestation verification message 180 using the processor-based device public DAK, thereby allowing only the processor-based device 110 generating the claim attestation message 170 to decrypt the attestation verification message 180.

Turning now to FIG. 2C, in response to receipt of the encrypted attestation message 180, the TEE circuitry 150 in the processor-based device 110 first decrypts the attestation message using the processor-based device private DAK. The TEE circuitry 150 decrypts the attestation verification message 170 (the encrypted AAIK) to confirm that the received attestation verification message 180 contains the latest AAIK 292. In embodiments, the TEE circuitry 150 also verifies the manufacturer signature 182 included with the attestation verification message 180. In response to confirming the attestation verification message 180 includes the latest AAIK 292 and verification of the manufacturer signature 182, the TEE circuitry generates a transfer credential message (i.e., the third encrypted message) 190.

The transfer credential message 190 includes the decrypted attestation verification message 180, along with the public AAIK 292, the RHK 294, and a device signature 296 generated using the public AAIK 292. The information contained in the transfer credential message 190 permits the processor-based device owner/next owner to verify that the manufacturer has authenticated and/or verified that the AAIK included in the original claim attestation message 170 is the same as the AAIK 292 included in the transfer credential message 190. In embodiments the transfer credential message 190 may be encrypted with a public key associated with the owner/next owner of the processor-based device 110.

Figure 3:
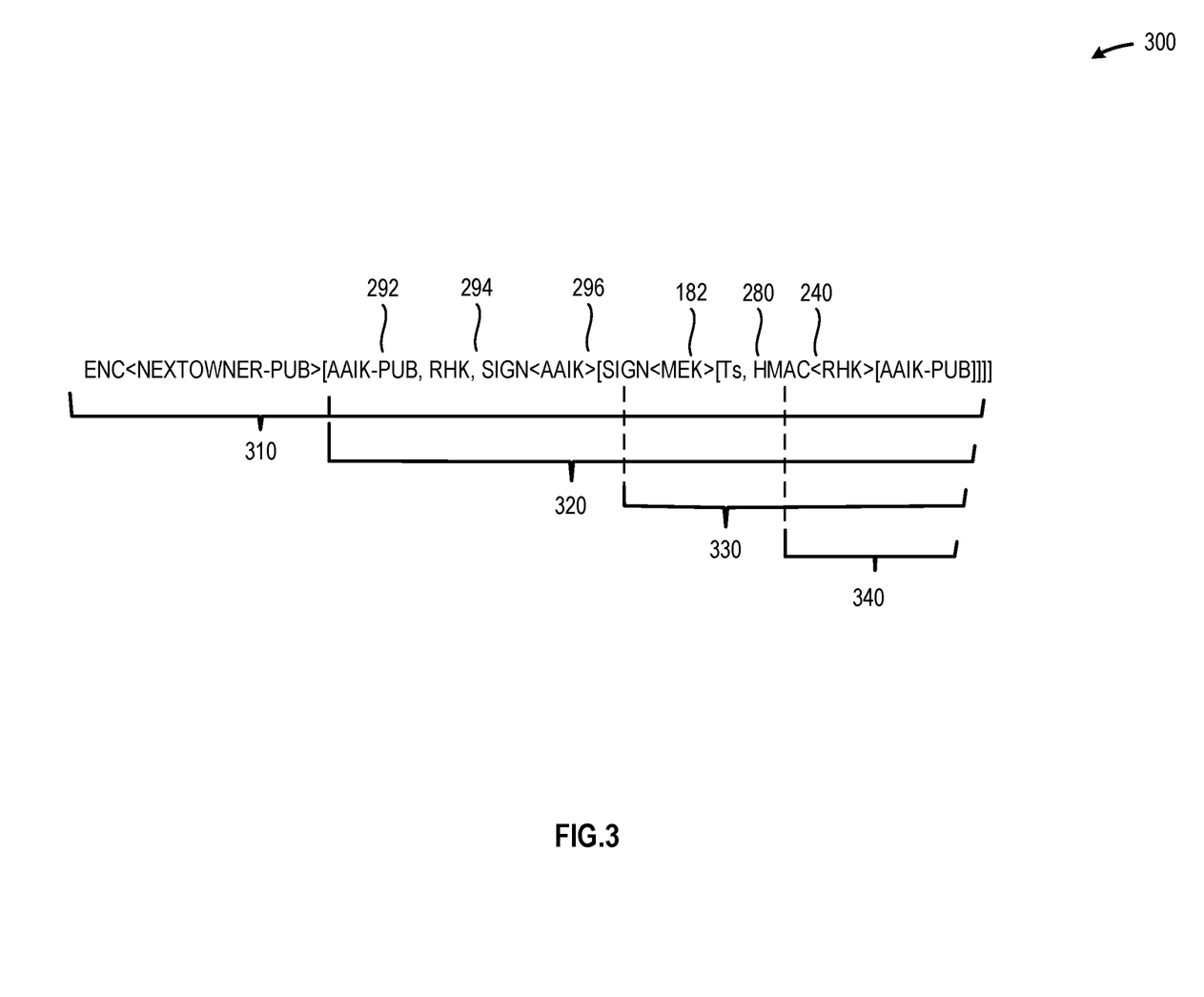
FIG. 3 depicts an example format for an illustrative transfer credential message, in accordance with at least one embodiment described herein.

FIG. 3 depicts an example format 300 for an illustrative transfer credential message 190, in accordance with at least one embodiment described herein. The transfer credential message (i.e., the third encrypted message) 190 may include any number of fields. As depicted in FIG. 3, the transfer credential message 190 may include but is not limited to: a first field 310 that includes the HMAC attestation claim 240; a second field 320 signed with the manufacturer's signature 182 and which includes metadata 280 associated with the manufacturer's signature 182 (e.g., a time stamp or similar), and the HMAC attestation claim 240; and a third field 330 that includes that includes the public AAIK 292, the RHK associated with the HMAC 294, and a processor-based device signature using the AAIK 296. In embodiments, all of the fields 340 included in the transfer credential message 190 are encrypted using the next owner's public key (<NextOwner-pub>) 312 to provide the third encrypted message.

Figure 4:
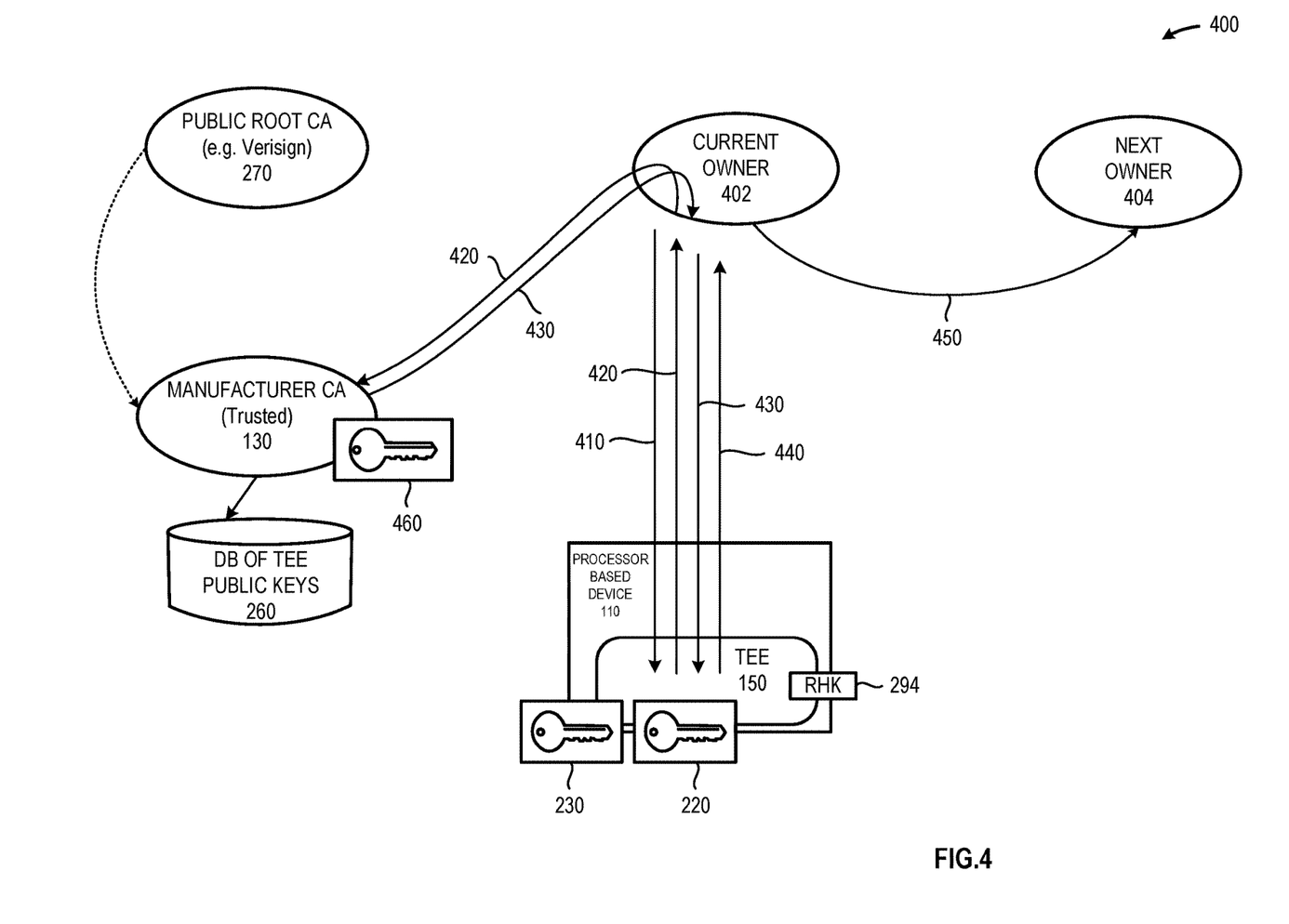
FIG. 4 depicts an example protocol flow diagram of an illustrative trusted ownership re-key with attestation method, in accordance with at least one embodiment described herein.

FIG. 4 depicts an example protocol flow diagram 400 of an illustrative trusted ownership re-key with attestation method, in accordance with at least one embodiment described herein. As depicted in FIG. 4, the current owner/user 402 requests the re-key process by providing an input 410 to the TEE circuitry 150 requesting the re-key. The TEE circuitry 150 in the processor-based device 110 responds to the request by generating the AAIK 292 and generating an RHK 294 to provide the HMAC attestation claim 240. The TEE circuitry 150 then generates the first message which includes the public DAK 172 assigned by the manufacturer to the processor-based device 110, the HMAC attestation claim 2450, and a device signature 250. The TEE circuitry 150 encrypts the first message using a public key associated with the manufacturer to provide the first encrypted message (i.e., the attestation claim message) 170. The TEE circuitry 150 causes the communication 420 of the first encrypted message to the at least one external device 130.

Upon receipt of the first encrypted message 170, the at least one external device 130 decrypts the message to obtain the public DAK 172 of the processor-based device 110. The at least one external device 130 compares the received public DAK 172 with a data store, data structure, data table or database containing information and/or data representative of one or more manufacturer authenticated lists of public DAKs 460 associated with the manufacturer's processor-based devices 110 and confirms the received public DAK 172 is associated with or assigned to a processor-based device 110 that is valid and unrevoked. In response to a successful confirmation of the public DAK 172, the at least one device generates a second message. The second message includes but is not limited to: the HMAC attestation claim 240, metadata 280 associated with the manufacturer's attestation of the public DAK 172 associated with the processor-based device 110, and a manufacturer's signature 182. The one or more external devices 130 then encrypts the second message using the public DAK 172 associated with the processor-based device 110 to provide the second encrypted message (i.e., the attestation verification message) 180. The one or more external devices 130 then communicate 430 the second encrypted message 180 to the TEE circuitry 150 in the processor-based device 110.

Upon receipt of the second encrypted message 180, the TEE circuitry 150 decrypts the message using the processor-based device private DAK. In embodiments, the TEE circuitry 150 then decrypts the attestation verification message 170 (the encrypted AAIK) to confirm that the received second message contains the latest AAIK 292. In embodiments, the TEE circuitry 150 also verifies the manufacturer signature 182 included with the second message 180. In response to confirming the attestation verification message 180 includes the latest AAIK 292 and verification of the manufacturer signature 182, the TEE circuitry generates a third message (i.e., the transfer credential message) 190.

The third message 190 includes the decrypted attestation verification message 180, along with the public AAIK 292, the RHK 294, and a device signature 296 generated using the public AAIK 292. In embodiments the TEE circuitry 150 encrypts the third message 190 using a public key associated with the owner/next owner of the processor-based device 110. The processor-based device 110 then includes a new, anonymous AAIK useable by the owner 402/next owner 404.

In embodiments where the current device owner/user has requested an anonymous re-key, after the generation of the transfer credential message 190, the TEE circuitry 150 may encrypt the third message using a public key associated with the current owner/user 402. The content of the third encrypted message may then be communicated 440 to the current owner/user 402 of the processor-based device 110.

In embodiments, where the current device owner/user 402 has requested a transfer of the processor-based device to a next owner/user 404, after the generation of the transfer credential message 190, the TEE circuitry 150 may encrypt the third message using a public key associated with the next owner/user 404. The content of the third encrypted message may then be communicated 450 to the next owner/user 404 of the processor-based device 110. Note that in this instance, the current owner/user 402 of the processor-based device 110 is unable to access either the AAIK 292 or the RHK 294 in the TEE circuitry 150—thus the AAIK received by the next owner/user 404 is unknown to both the manufacturer or the current owner/user 402, however the next owner/user 404 is beneficially able to receive the manufacturer signed attestation of the provenance of the processor-based device 110.

Figure 5:
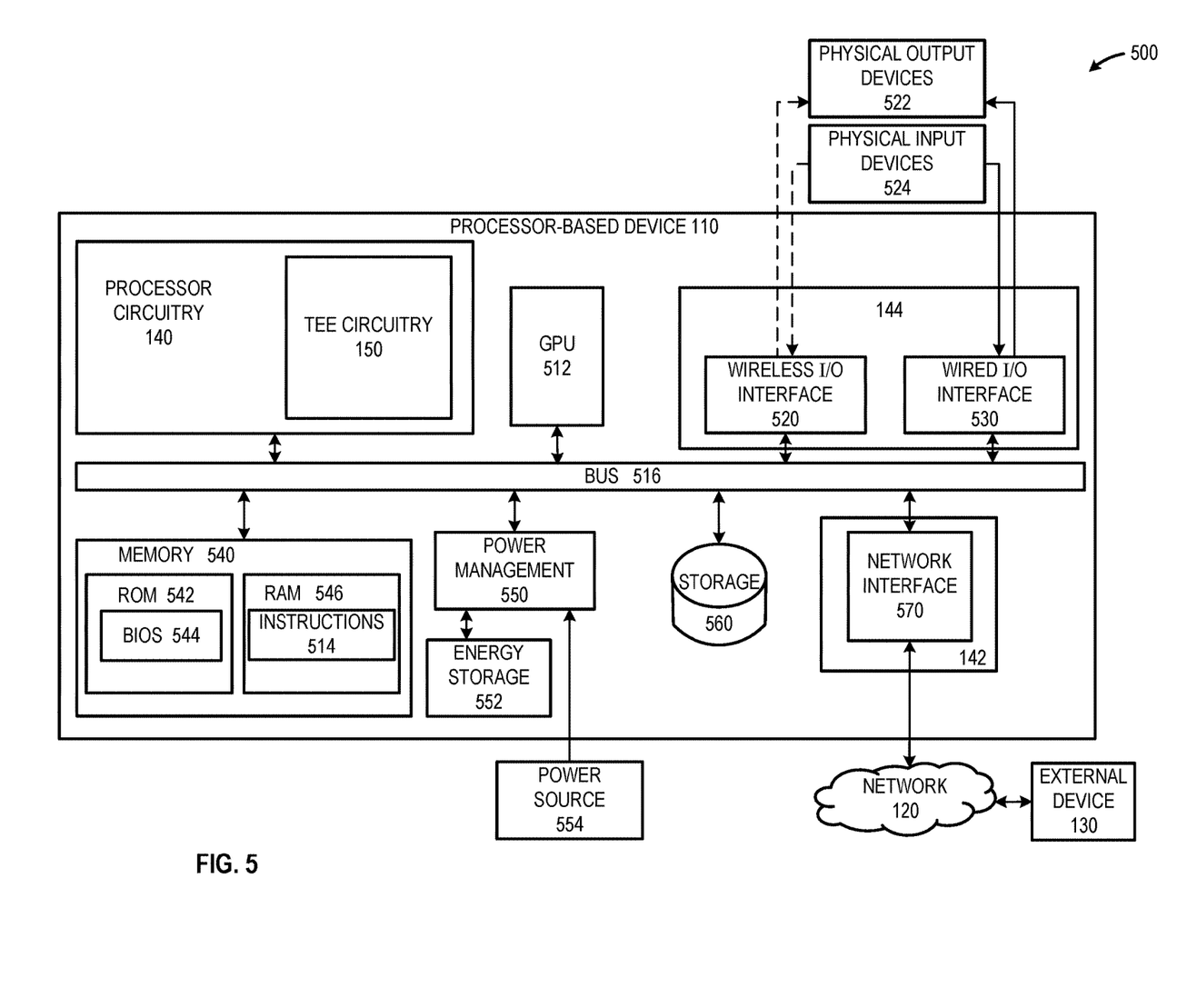
FIG. 5 is a schematic diagram of an illustrative system incorporating a processor-based device that includes processor circuitry and TEE circuitry coupled to one or more external devices via one or more networks, in accordance with at least one embodiment described herein.

FIG. 5 is a schematic diagram of an illustrative system 500 incorporating a processor-based device 110 that includes processor circuitry 140 and TEE circuitry 150 coupled to one or more external devices 130 via one or more networks 120, in accordance with at least one embodiment described herein. In embodiments, the processor-based device 110 may additionally include one or more of the following: graphics processing unit (GPU) circuitry 512, I/O interface circuitry 144 (e.g., wireless input/output (I/O) interface circuitry 520 and/or a wired I/O interface circuitry 530), system memory circuitry 540, power management circuitry 550, communications interface circuitry 142 (e.g., wireless/wired network interface circuitry 570) coupled via one or more networks 120, and a non-transitory storage device 130. The following discussion provides a brief, general description of the components forming the illustrative processor-based device 110. Example, non-limiting processor-based devices 110 may include, but are not limited to: smartphones, wearable computers, portable computing devices, handheld computing devices, desktop computing devices, blade server devices, workstations, and similar.

Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 140 may include any number of hardwired or configurable circuits, some or all of which may include programmable and/or configurable combinations of electronic components, semiconductor devices, and/or logic elements that are disposed partially or wholly in a cloud-based server or other similar computing systems and/or devices capable of executing processor-readable instructions.

The processor-based device 110 includes a bus or similar communications link 516 that communicably couples and facilitates the exchange of information and/or data between various system components including the processor circuitry 140, the I/O interface circuitry 144, the system memory 540, the communication interface circuitry 142, and/or the one or more storage devices 130. The processor-based device 110 may be referred to in the singular herein, but this is not intended to limit the embodiments to a single processor-based device 110, since in certain embodiments, there may be more than one processor-based device 110 that incorporates, includes, or contains any number of communicably coupled, collocated, or remote networked circuits or devices.

The processor circuitry 140 may include any number, type, or combination of currently available or future developed devices capable of executing machine-readable instruction sets. The processor circuitry 140 may include individual single- or multi-thread cores disposed in one or more CPUs. The processor circuitry 140 may include but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 5 are of conventional design. Consequently, such blocks need not be described in further detail herein, as they will be understood by those skilled in the relevant art. The bus 516 that interconnects at least some of the components of the processor-based device 110 may employ any currently available or future developed serial or parallel bus structures or architectures.

The system memory circuitry 540 may include read-only memory ("ROM") 542 and random access memory ("RAM") 546. A portion of the ROM 542 may be used to store or otherwise retain a basic input/output system ("BIOS") 544. In embodiments, at least some of the one or more machine-readable instruction sets 514 cause at least a portion of the processor circuitry 140 to provide, create, produce, transition, and/or function as a dedicated, specific, and particular machine, for example a word processing machine, a digital image acquisition machine, a media playing machine, a gaming system, a communications device, a smartphone, or similar.

The I/O interface circuitry 144 may include at least one wireless input/output (I/O) interface 520. The at least one wireless I/O interface 520 may be communicably coupled to one or more physical output devices 522 (tactile devices, video displays, audio output devices, hardcopy output devices, etc.). The at least one wireless I/O interface 520 may communicably couple to one or more physical input devices 524 (pointing devices, touchscreens, keyboards, tactile devices, etc.). The at least one wireless I/O interface 520 may include any currently available or future developed wireless I/O interface. Example wireless I/O interfaces include, but are not limited to: BLUETOOTH®, near field communication (NFC), and similar.

The I/O interface circuitry 144 may include one or more wired input/output (I/O) interfaces 530. The at least one wired I/O interface 530 may be communicably coupled to one or more physical output devices 522 (tactile devices, video displays, audio output devices, hardcopy output devices, etc.). The at least one wired I/O interface 530 may be communicably coupled to one or more physical input devices 524 (pointing devices, touchscreens, keyboards, tactile devices, etc.). The wired I/O interface 530 may include any currently available or future developed I/O interface. Example wired I/O interfaces 530 include, but are not limited to: universal serial bus (USB), IEEE 1394 ("FireWire"), and similar.

The processor-based device 110 may include one or more communicably coupled, non-transitory, data storage devices 560. The data storage devices 560 may include one or more hard disk drives (HDDs) and/or one or more solid-state storage devices (SSDs). The data storage devices 560 may be disposed local to the processor circuitry 140 or may be disposed remote from the processor circuitry 140. The one or more data storage devices 560 may include any current or future developed storage appliances, network storage devices, and/or systems. Non-limiting examples of such data storage devices 560 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 560 may include one or more removable storage devices, such as one or more flash drives, flash memories, flash storage units, or similar appliances or devices capable of communicable coupling to and decoupling from the processor-based device 110.

The one or more data storage devices 560 may include interfaces or controllers (not shown) communicatively coupling the respective storage device or system to the bus 516. The one or more data storage devices 560 may store, retain, or otherwise contain machine-readable instruction sets, data structures, program modules, data stores, databases, logical structures, and/or other data useful to the processor circuitry 140 and/or one or more applications executed on or by the processor circuitry 140. In some instances, one or more data storage devices 560 may be communicably coupled to the processor circuitry 140, for example via the bus 516 or via one or more wired communications interfaces 530 (e.g., Universal Serial Bus or USB); one or more wireless communications interfaces 520 (e.g., Bluetooth®, Near Field Communication or NFC); and/or one or more network interfaces 570 (IEEE 802.3 or Ethernet, IEEE 802.11, or WiFi®, etc.).

Processor-readable instruction sets 514 and other programs, applications, logic sets, and/or modules may be stored in whole or in part in the system memory circuitry 540. Such instruction sets 514 may be transferred, in whole or in part, from the one or more data storage devices 560. The instruction sets 514 may be loaded, stored, or otherwise retained in system memory circuitry 540, in whole or in part, during execution by the processor circuitry 140.

The processor-based device 110 may include power management circuitry 550 that controls one or more operational aspects of the energy storage device 552. In embodiments, the energy storage device 552 may include one or more primary (i.e., non-rechargeable) or secondary (i.e., rechargeable) batteries or similar energy storage devices. In embodiments, the energy storage device 552 may include one or more supercapacitors or ultracapacitors. In embodiments, the power management circuitry 550 may alter, adjust, or control the flow of energy from an external power source 554 to the energy storage device 552 and/or to the processor-based device 110. The power source 554 may include, but is not limited to, a solar power system, a commercial electric grid, a portable generator, an external energy storage device, or any combination thereof.

For convenience, the processor circuitry 140, the I/O interface circuitry 144, the system memory 540, the power management circuitry 550, the storage device 560, and the communication interface circuitry 142 are illustrated as communicatively coupled to each other via the bus 516, thereby providing connectivity between the above-described components. In alternative embodiments, the above-described components may be communicatively coupled in a different manner than illustrated in FIG. 5. For example, one or more of the above-described components may be directly coupled to other components, or may be coupled to each other, via one or more intermediary components (not shown). In another example, one or more of the above-described components may be integrated into the processor circuitry 140. In some embodiments, all or a portion of the bus 516 may be omitted and the components are coupled directly to each other using suitable wired or wireless connections.

While FIG. 4 illustrates various operations according to one or more embodiments, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The present disclosure is directed to systems and methods of providing a trusted ownership re-key with attestation in a processor-based device. The processor-based device includes processor circuitry that incorporates trusted execution environment (TEE) circuitry. The re-key process is initiated by a current owner of the processor-based device. In response the TEE circuitry generates an AAIK and encrypts the AAIK using HMAC with a randomly generated key. The TEE circuitry forms a first message using the HMAC, a public DAK assigned to the processor-based device, and a device signature. The TEE circuitry encrypts the first message and communicates the encrypted message to the manufacturer. The manufacturer attests to the validity of the processor-based device based on the public DAK and generates a second message that includes the HMAC and a manufacturer signature. The manufacturer encrypts the second message and communicates the message to the TEE circuitry. Upon receipt the TEE circuitry validates the AAIK data in the second message against the most recent AAIK and generates a third message that includes the HMAC, the original AAIK, the RHK used in the HMAC and the manufacturer attestation. The AAIK thus remains unknown to both the current owner and the manufacturer.

The following examples pertain to further embodiments. The following examples of the present disclosure may comprise subject material such as at least one device, a method, at least one machine-readable medium for providing a systems and methods of providing a trusted ownership re-key with attestation in a processor-based device.

According to example 1, there is provided a host device attestation system. The system may include: input/output interface circuitry; communications interface circuitry; processor circuitry that includes trusted execution environment (TEE) circuitry, the TEE circuitry to: generate an anonymous attestation identification key (AAIK); generate an attestation claim message that includes: data based, at least in part, on the anonymous AAIK; and data representative of a manufacturer assigned, private, device attestation key (DAK) stored in the TEE, the manufacturer assigned, private, DAK uniquely identifying the host device; generate, responsive to receipt of an attestation verification message from the manufacturer, a transfer credential message that includes: the data based, at least in part, on the anonymous AAIK; and data representative of an attestation verification by the manufacturer, wherein the attestation verification message from the manufacturer includes: data representative of the manufacturer device attestation verification; and data representative of a manufacturer signature.

Example 2 may include elements of example 1 where the data based, at least in part, on the anonymous AAIK includes: a random hash-based method authentication code (HMAC) that uses the AAIK; and an HMAC key (RHK) randomly generated by the host device.

Example 3 may include elements of examples 1 or 2 where the RHK randomly generated by the host device includes: an RHK randomly generated by the TEE circuitry in the host device.

Example 4 may include elements of any of examples 1 through 3, and the TEE circuitry may further: encrypt the attestation claim message using a public key issued by the manufacturer.

Example 5 may include elements of any of examples 1 through 4 where the attestation verification message is encrypted using the manufacturer assigned, public, DAK.

Example 6 may include elements of any of examples 1 through 5 where the transfer credential message is encrypted using an externally supplied public key.

Example 7 may include elements of any of examples 1 through 6 where the data representative of the manufacturer device attestation verification included in the transfer credential message may include: data representative of a timestamp associated with the manufacturer device attestation verification.

According to example 8, there is provided a host device attestation method. The method may include: generating, by a host device, a first encrypted message using a private key known to a first entity affiliated with the host device; communicating, by input/output (I/O) interface circuitry in the host device, the first encrypted message to a manufacturer of the host device; receiving, at the host device, a second encrypted message that includes data representative of an attestation verification by the host device manufacturer; and generating, by the host device, a third encrypted message that includes: the data representative of the received attestation verification; and at least a portion of the first encrypted message responsive to receipt of attestation verification.

Example 9 may include elements of example 8 where generating the first encrypted message using the private key known to the first entity affiliated with the host device may include: generating, in a trusted execution environment (TEE) in the host device, the first encrypted message using the private key known to the first entity affiliated with the host device.

Example 10 may include elements of any of examples 8 or 9 where generating the first encrypted message using the private key known to the first entity affiliated with the host device may include: generating, by the host device, the first encrypted message using the private key known to at least one of: the host device manufacturer or a third party representative of the host device manufacturer.

Example 11 may include elements of any of examples 8 through 10 where generating the first encrypted message using the private key known to the first entity affiliated with the host device may include: generating, by the host device, an anonymous attestation identification key (AAIK); generating, by the host device, data representative of a random hash key (RHK); generating, by the host device, a random hash-based method authentication code (HMAC) using the AAIK and the RHK; generating a first message that includes the HMAC and data representative of a private device attestation key (DAK) stored in a trusted execution environment within the host device and known to at least one of: the host device manufacturer or a third party representative of the host device manufacturer; and encrypting the combined first message with a public DAK stored in the TEE circuitry to provide the first encrypted message.

Example 12 may include elements of any of examples 8 through 11 where receiving a second encrypted message that includes data representative of an attestation verification by the host device manufacturer may include: receiving, from the host device manufacturer at the I/O interface circuitry of the host device, the second encrypted message that includes data representative of an attestation verification by the host device manufacturer, wherein the attestation verification includes: data representative of a signature of the host device manufacturer and the HMAC.

Example 13 may include elements of any of examples 8 through 12 where receiving the second encrypted message that includes data representative of an attestation verification by the host device manufacturer may further include: receiving the second encrypted message that includes data representative of an attestation verification by the host device manufacturer that further includes at least one of: data representative of a timestamp associated with the host device manufacturer signature or metadata provided by at least one of: the host device manufacturer or a third party representative of the host device manufacturer.

Example 14 may include elements of any of examples 8 through 13 where generating the third encrypted message responsive to receipt of attestation verification may include: generating, by the TEE circuitry in the host device, the third encrypted message responsive to receipt of attestation verification by the host device manufacturer, the third encrypted message including: at least a portion of the data representative of the received attestation verification by the host device manufacturer; and the data representative of the AAIK and the RHK.

Example 15 may include elements of any of examples 8 through 14 where the third encrypted message is encrypted using a public key associated with a third party that possesses the host device.

Example 16 may include elements of any of examples 8 through 15 where receiving a second encrypted message that includes data representative of an attestation verification by the host device manufacturer may include: receiving, at the host device, the second encrypted message encrypted using the public DAK.

According to example 17, there is provided a non-transitory storage device. The non-transitory storage device includes instructions that, when executed by trusted execution environment (TEE) circuitry in a host device, cause the TEE circuitry to: generate a first encrypted message using a private key known to a first entity affiliated with the host device; cause a communication of the first encrypted message to a manufacturer of the host device via input/output (I/O) interface circuitry in the host device; and generate, in response to receipt of a second encrypted message that includes data representative of an attestation verification by the host device manufacturer, a third encrypted message that includes: the data representative of the received attestation verification; and at least a portion of the first encrypted message responsive to receipt of attestation verification.

Example 18 may include elements of example 17 where the instructions that cause the TEE circuitry to generate the first encrypted message using the private key known to the first entity affiliated with the host device further cause the TEE circuitry to: generate the first encrypted message using the private key known to at least one of: the host device manufacturer or a third party representative of the host device manufacturer.

Example 19 may include elements of any of examples 17 or 18 where the instructions that cause the TEE circuitry to generate the first encrypted message using the private key known to the first entity affiliated with the host device further cause the TEE circuitry to: generate an anonymous attestation identification key (AAIK); generate data representative of a random hash key (RHK); generate a random hash-based method authentication code (HMAC) using the AAIK and the RHK; generate a first message that includes the HMAC and data representative of a private device attestation key (DAK) stored in a trusted execution environment within the host device and known to at least one of: the host device manufacturer or a third party representative of the host device manufacturer; and public/private key encrypt the first message with a public DAK stored in the TEE circuitry to provide the first encrypted message.

Example 20 may include elements of any of examples 17 through 19 where the instructions that cause the TEE circuitry to generate the third encrypted message in response to receipt of a second encrypted message that includes data representative of an attestation verification by the host device manufacturer, further cause the TEE circuitry to: generate the third encrypted message in response to receipt of a second encrypted message that includes data representative of an attestation verification by the host device manufacturer, wherein the attestation verification includes: data representative of a signature of the host device manufacturer and the HMAC.

Example 21 may include elements of any of examples 17 through 20 where the instructions that cause the TEE circuitry to generate the third encrypted message in response to receipt of a second encrypted message that includes data representative of an attestation verification by the host device manufacturer, wherein the attestation verification includes: data representative of a signature of the host device manufacturer and the HMAC further cause the TEE circuitry to: generate the third encrypted message in response to receipt of a second encrypted message that further includes at least one of: data representative of a timestamp associated with the host device manufacturer signature or metadata provided by at least one of: the host device manufacturer or a third party representative of the host device manufacturer.

Example 22 may include elements of any of examples 17 through 21 where the instructions that cause the TEE circuitry to generate the third encrypted message in response to receipt of a second encrypted message that includes data representative of an attestation verification by the host device manufacturer, wherein the attestation verification includes: data representative of a signature of the host device manufacturer and the HMAC further cause the TEE circuitry to: generate the third encrypted message responsive to receipt of attestation verification by the host device manufacturer, the third encrypted message including: at least a portion of the data representative of the received attestation verification by the host device manufacturer; and the data representative of the AAIK and the RHK.

Example 23 may include elements of any of examples 17 through 22 where the instructions that cause the TEE circuitry to generate the third encrypted message in response to receipt of the second encrypted message further cause the TEE circuitry to: generate the third encrypted message using a public key associated with a third party that possesses the host device.

Example 24 may include elements of any of examples 17 through 23 where the instructions that cause the TEE circuitry to generate the third encrypted message in response to receipt of a second encrypted message that includes data representative of an attestation verification by the host device manufacturer, further cause the TEE circuitry to: generate the third encrypted message in response to receipt of a second encrypted message encrypted using the public DAK.

According to example 25, there is provided a host device attestation system. The system may include: means for generating a first encrypted message using a private key known to a first entity affiliated with the host device; means for communicating the first encrypted message to a manufacturer of the host device; means for receiving a second encrypted message that includes data representative of an attestation verification by the host device manufacturer; and means for generating a third encrypted message that includes: the data representative of the received attestation verification; and at least a portion of the first encrypted message responsive to receipt of attestation verification.

Example 26 may include elements of example 25 where the means for generating the first encrypted message using the private key known to the first entity affiliated with the host device may include: means for generating, in a trusted execution environment (TEE), the first encrypted message using the private key known to the first entity affiliated with the host device.

Example 27 may include elements of examples 25 or 26 where the means for generating the first encrypted message using the private key known to the first entity affiliated with the host device may include: means for generating the first encrypted message using the private key known to at least one of: the host device manufacturer or a third party representative of the host device manufacturer.

Example 28 may include elements of any of examples 25 through 27 where the means for generating the first encrypted message using the private key known to the first entity affiliated with the host device may include: means for generating an anonymous attestation identification key (AAIK); means for generating data representative of a random hash key (RHK); means for generating a random hash-based method authentication code (HMAC) using the AAIK and the RHK; means for generating a first message that includes the HMAC and data representative of a private device attestation key (DAK) stored in a trusted execution environment within the host device and known to at least one of: the host device manufacturer or a third party representative of the host device manufacturer; and means for encrypting the combined first message with a public DAK stored in the TEE circuitry to provide the first encrypted message.

Example 29 may include elements of any of examples 25 through 28 where the means for receiving a second encrypted message that includes data representative of an attestation verification by the host device manufacturer may include: means for receiving the second encrypted message that includes data representative of an attestation verification by the host device manufacturer, wherein the attestation verification includes: data representative of a signature of the host device manufacturer and the HMAC.

Example 30 may include elements of any of examples 25 through 29 where the means for receiving the second encrypted message that includes data representative of an attestation verification by the host device manufacturer may further include: means for receiving the second encrypted message that includes data representative of an attestation verification by the host device manufacturer that further includes at least one of: data representative of a timestamp associated with the host device manufacturer signature or metadata provided by at least one of: the host device manufacturer or a third party representative of the host device manufacturer.

Example 31 may include elements of any of examples 25 through 30 where the means for generating the third encrypted message responsive to receipt of attestation verification may include: means for generating the third encrypted message responsive to receipt of attestation verification by the host device manufacturer, the third encrypted message including: at least a portion of the data representative of the received attestation verification by the host device manufacturer; and the data representative of the AAIK and the RHK.

Example 32 may include elements of any of examples 25 through 31 where the means for receiving the second encrypted message that includes data representative of the attestation verification by the host device manufacturer may include: means for receiving the second encrypted message encrypted using the public DAK.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:
1. A host device attestation system, comprising:
 input/output interface circuitry;
 communications interface circuitry;
 processor circuitry that includes trusted execution environment (TEE) circuitry, the TEE circuitry to:
  generate an anonymous attestation identification key (AAIK);
  generate an attestation claim message that includes:
   data based, at least in part, on the anonymous AAIK; and
   data representative of a manufacturer assigned, private, device attestation key (DAK) stored in the TEE, the manufacturer assigned, private, DAK uniquely identifying the host device
  generate, responsive to receipt of an attestation verification message from the manufacturer, a transfer credential message that includes:
   the data based, at least in part, on the anonymous AAIK; and
   data representative of an attestation verification by the manufacturer, wherein the attestation verification message from the manufacturer includes:
    data representative of the manufacturer device attestation verification; and
    data representative of a manufacturer signature.

2. The system of claim 1, wherein the data based, at least in part, on the anonymous AAIK comprises:
a random hash-based method authentication code (HMAC) that uses the AAIK and an HMAC key (RHK) randomly generated by the host device.

3. The system of claim 2, wherein the RHK randomly generated by the host device comprises:
an RHK randomly generated by the TEE circuitry in the host device.

4. The system of claim 1, the TEE circuitry to further:
encrypt the attestation claim message using a public key associated with the manufacturer.

5. The system of claim 1 wherein the attestation verification message is encrypted using the manufacturer assigned, public, DAK.

6. The system of claim 1 wherein the transfer credential message is encrypted using an externally supplied public key.

7. The system of claim 1 wherein the data representative of the manufacturer device attestation verification included in the transfer credential message comprises:
data representative of a timestamp associated with the manufacturer device attestation verification.

8. A host device attestation method, comprising:
generating, by a host device, a first encrypted message using a private key known to a first entity affiliated with the host device;
communicating, by input/output (I/O) interface circuitry in the host device, the first encrypted message to a manufacturer of the host device;
receiving, at the host device, a second encrypted message that includes data representative of an attestation verification by the host device manufacturer; and
generating, by the host device, a third encrypted message that includes:
the data representative of the received attestation verification; and
at least a portion of the first encrypted message responsive to receipt of attestation verification.

9. The method of claim 8 wherein generating the first encrypted message using the private key known to the first entity affiliated with the host device comprises:
generating, in a trusted execution environment (TEE) in the host device, the first encrypted message using the private key known to the first entity affiliated with the host device.

10. The method of claim 9 wherein generating the first encrypted message using the private key known to the first entity affiliated with the host device comprises:
generating, by the host device, the first encrypted message using the private key known to at least one of: the host device manufacturer or a third party representative of the host device manufacturer.

11. The method of claim 8 wherein generating the first encrypted message using the private key known to the first entity affiliated with the host device comprises:
generating, by the host device, an anonymous attestation identification key (AAIK);
generating, by the host device, data representative of a random hash key (RHK);
generating, by the host device, a random hash-based method authentication code (HMAC) using the AAIK and the RHK;
generating a first message that includes the HMAC and data representative of a private device attestation key (DAK) stored in a trusted execution environment within the host device and known to at least one of: the host device manufacturer or a third party representative of the host device manufacturer; and
encrypting the combined first message with a public DAK stored in the TEE circuitry to provide the first encrypted message.

12. The method of claim 11 wherein receiving a second encrypted message that includes data representative of an attestation verification by the host device manufacturer comprises:
receiving, from the host device manufacturer at the I/O interface circuitry of the host device, the second encrypted message that includes data representative of an attestation verification by the host device manufacturer, wherein the attestation verification includes: data representative of a signature of the host device manufacturer and the HMAC.

13. The method of claim 12 wherein receiving the second encrypted message that includes data representative of an attestation verification by the host device manufacturer further comprises:
receiving the second encrypted message that includes data representative of an attestation verification by the host device manufacturer that further includes at least one of: data representative of a timestamp associated with the host device manufacturer signature or metadata provided by at least one of: the host device manufacturer or a third party representative of the host device manufacturer.

14. The method of claim 12 wherein generating the third encrypted message responsive to receipt of attestation verification comprises:
generating, by the TEE circuitry in the host device, the third encrypted message responsive to receipt of attestation verification by the host device manufacturer, the third encrypted message including:
at least a portion of the data representative of the received attestation verification by the host device manufacturer; and
the data representative of the AAIK and the RHK.

15. The method of claim 14 wherein the third encrypted message is encrypted using a public key associated with a third party that possesses the host device.

16. The method of claim 11 wherein receiving a second encrypted message that includes data representative of an attestation verification by the host device manufacturer comprises:
receiving, at the host device, the second encrypted message encrypted using the public DAK.

17. A non-transitory storage device that includes instructions that, when executed by trusted execution environment (TEE) circuitry in a host device, cause the TEE circuitry to:
generate a first encrypted message using a private key known to a first entity affiliated with the host device;
cause a communication of the first encrypted message to a manufacturer of the host device via input/output (I/O) interface circuitry in the host device; and
generate, in response to receipt of a second encrypted message that includes data representative of an attestation verification by the host device manufacturer, a third encrypted message that includes:
the data representative of the received attestation verification; and
at least a portion of the first encrypted message responsive to receipt of attestation verification.

18. The non-transitory storage device of claim 17 wherein the instructions that cause the TEE circuitry to generate the first encrypted message using the private key known to the first entity affiliated with the host device further cause the TEE circuitry to:

generate the first encrypted message using the private key known to at least one of: the host device manufacturer or a third party representative of the host device manufacturer.

19. The non-transitory storage device of claim 17 wherein the instructions that cause the TEE circuitry to generate the first encrypted message using the private key known to the first entity affiliated with the host device further cause the TEE circuitry to:

generate an anonymous attestation identification key (AAIK);
generate data representative of a random hash key (RHK);
generate a random hash-based method authentication code (HMAC) using the AAIK and the RHK;
generate a first message that includes the HMAC and data representative of a private device attestation key (DAK) stored in a trusted execution environment within the host device and known to at least one of: the host device manufacturer or a third party representative of the host device manufacturer; and
public/private key encrypt the first message with a public DAK stored in the TEE circuitry to provide the first encrypted message.

20. The non-transitory storage device of claim 19 wherein the instructions that cause the TEE circuitry to generate the third encrypted message in response to receipt of a second encrypted message that includes data representative of an attestation verification by the host device manufacturer, further cause the TEE circuitry to:

generate the third encrypted message in response to receipt of a second encrypted message that includes data representative of an attestation verification by the host device manufacturer, wherein the attestation verification includes: data representative of a signature of the host device manufacturer and the HMAC.

21. The non-transitory storage device of claim 20 wherein the instructions that cause the TEE circuitry to generate the third encrypted message in response to receipt of a second encrypted message that includes data representative of an attestation verification by the host device manufacturer, wherein the attestation verification includes: data representative of a signature of the host device manufacturer and the HMAC further cause the TEE circuitry to:

generate the third encrypted message in response to receipt of a second encrypted message that further includes at least one of: data representative of a timestamp associated with the host device manufacturer signature or metadata provided by at least one of: the host device manufacturer or a third party representative of the host device manufacturer.

22. The non-transitory storage device of claim 20 wherein the instructions that cause the TEE circuitry to generate the third encrypted message in response to receipt of a second encrypted message that includes data representative of an attestation verification by the host device manufacturer, wherein the attestation verification includes: data representative of a signature of the host device manufacturer and the HMAC further cause the TEE circuitry to:

generate the third encrypted message responsive to receipt of attestation verification by the host device manufacturer, the third encrypted message including:
at least a portion of the data representative of the received attestation verification by the host device manufacturer; and
the data representative of the AAIK and the RHK.

23. The non-transitory storage device of claim 22 wherein the instructions that cause the TEE circuitry to generate the third encrypted message in response to receipt of the second encrypted message further cause the TEE circuitry to:

generate the third encrypted message using a public key associated with a third party that possesses the host device.

24. The non-transitory storage device of claim 17 wherein the instructions that cause the TEE circuitry to generate the third encrypted message in response to receipt of a second encrypted message that includes data representative of an attestation verification by the host device manufacturer, further cause the TEE circuitry to:

generate the third encrypted message in response to receipt of a second encrypted message encrypted using the public DAK.

25. A host device attestation system, comprising:
means for generating a first encrypted message using a private key known to a first entity affiliated with the host device;
means for communicating the first encrypted message to a manufacturer of the host device;
means for receiving a second encrypted message that includes data representative of an attestation verification by the host device manufacturer; and
means for generating a third encrypted message that includes:
the data representative of the received attestation verification; and
at least a portion of the first encrypted message responsive to receipt of attestation verification.

* * * * *